(12) United States Patent
Nakayama et al.

(10) Patent No.: US 11,491,719 B2
(45) Date of Patent: Nov. 8, 2022

(54) SHAPING APPARATUS

(71) Applicant: FUJIFILM BUSINESS INNOVATION CORP., Tokyo (JP)

(72) Inventors: Daisuke Nakayama, Ebina (JP); Taichi Yamada, Ebina (JP); Jiro Minabe, Ebina (JP); Kentaro Ageishi, Ebina (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 400 days.

(21) Appl. No.: 16/744,682

(22) Filed: Jan. 16, 2020

(65) Prior Publication Data

US 2020/0247047 A1 Aug. 6, 2020

(30) Foreign Application Priority Data

Jan. 31, 2019 (JP) .............................. JP2019-016249
Nov. 1, 2019 (JP) .............................. JP2019-200126

(51) Int. Cl.
*B29C 64/209* (2017.01)
*B33Y 30/00* (2015.01)
*B23Q 15/00* (2006.01)

(52) U.S. Cl.
CPC ............ *B29C 64/209* (2017.08); *B23Q 15/00* (2013.01); *B33Y 30/00* (2014.12)

(58) Field of Classification Search
CPC ...... B29C 64/209; B29C 64/393; B33Y 30/00
See application file for complete search history.

(56) References Cited

U.S. PATENT DOCUMENTS

2005/0029707 A1 2/2005 Kasai et al.
2006/0083806 A1 4/2006 Kasai et al.
2010/0285265 A1 11/2010 Shinoda et al.
2017/0157831 A1* 6/2017 Mandel ................. B29C 64/106
2017/0173884 A1* 6/2017 Ryan ..................... B29C 64/118
2017/0210074 A1* 7/2017 Ueda ..................... B29C 64/393
2018/0056584 A1* 3/2018 Wittner ................. B33Y 80/00

FOREIGN PATENT DOCUMENTS

| EP | 3 150 361 A1 | 4/2017 |
|----|--------------|--------|
| JP | 3742082 B2 | 2/2006 |
| JP | 5429599 B2 | 2/2014 |
| JP | 5482212 B2 | 5/2014 |
| RU | 2 674 138 C1 | 12/2018 |

OTHER PUBLICATIONS

Feb. 25, 2022 Office Action issued in European Patent Application No. 20 152 590.4.
Roudy Wehbe, "Modeling Of Tow Wrinkling In Automated Fiber Placement Based On Geometrical Considerations", 2017, University of South Carolina, p. 1-106, XP055887585.
Jun. 23, 2020 Extended Search Report issued in European Patent Application No. 20152590.4.

* cited by examiner

*Primary Examiner* — Thomas C Lee
*Assistant Examiner* — Charles Cai
(74) *Attorney, Agent, or Firm* — Oliff PLC

(57) ABSTRACT

Provided is a shaping apparatus including: a stage; and a delivery unit configured to: deliver and apply a shaping material in which continuous fibers is impregnated with a resin onto the stage; and, configured to change delivery amounts between an inner side and an outer side of a path of the shaping material according to a difference in path lengths between the inner side and the outer side, the difference being generated when an applying direction of the shaping material is changed.

20 Claims, 15 Drawing Sheets

FIG.12

|  | Plural shaping materials | Reel | Impregnation unit | Thin shaping material at inner side | Reduce Vf of shaping material at inner side | Evaluation |
|---|---|---|---|---|---|---|
| Example 1 | Exist Width 1 mm × thickness 0.5 mm × 4 pieces | Shaping material | Absent | No | No | Good |
| Example 2 | Exist | Carbon fiber | Present Width 1 mm × thickness 0.5 mm × 4 pieces | No | No | Good |
| Example 3 | Exist | Carbon fiber | Present Width 1 mm × thickness 0.5 mm × 4 pieces | Yes | No | Good |
| Example 4 | Exist | Carbon fiber | Present Width 1 mm × thickness 0.5 mm × 4 pieces | No | Yes | Good |
| Comparative Example | Absent Width 4 mm × thickness 0.5 mm × 1 piece | Shaping material | Absent | - | - | Bad Wrinkle or cut occurs |

FIG.15

| | Plural filaments | Four curved portion uniform | Only inner side of curved portion | Filaments at outer side | Condition | ΔR/ΔR1 | Flexural modulus GPa | Evaluation |
|---|---|---|---|---|---|---|---|---|
| Example 5 | Exist Width 1 mm × thickness 0.5 mm × 4 pieces | o | | | No | 0.91 | 30 | Good |
| Example 6 | Exist | o | | | 2.2% elongated CF T1000GB | 0.48 | 36 | Good |
| Example 7 | Exist | o | | | Vf: low | 0.59 | 28 | Good |
| Example 8 | Exist | o | | | Chopped CF | 0.15 | 22 | Good |
| Example 9 | Exist | o | | | Compatibilizer decreases | 0.68 | 32 | Good |
| Example 10 | Exist | o | | | Twisted CF | 0.56 | 38 | Good |
| Example 11 | Exist | o | | | Melted at high temperature | 0.76 | 31 | Good |
| Example 12 | Exist | | o | | 2.2% elongated CF T1000GB | 0.56 | 36 | Good |
| Example 13 | Exist | | o | | Vf: low | 0.62 | 32 | Good |
| Example 14 | Exist | | o | | Chopped CF | 0.12 | 25 | Good |
| Example 15 | Exist | | o | | Compatibilizer decreases | 0.71 | 34 | Good |
| Example 16 | Exist | | o | | Twisted CF | 0.66 | 37 | Good |
| Example 17 | Exist | | o | | Melted at high temperature | 0.81 | 32 | Good |
| Example 18 | Exist | | | o | 2.2% elongated CF T1000GB | 0.46 | 34 | Good |
| Example 19 | Exist | | | o | Vf: low | 0.61 | 30 | Good |
| Example 20 | Exist | | | o | Chopped CF | 0.19 | 25 | Good |
| Example 21 | Exist | | | o | Compatibilizer decreases | 0.69 | 32 | Good |
| Example 22 | Exist | | | o | Twisted CF | 0.61 | 38 | Good |
| Example 23 | Exist | | | o | Melted at high temperature | 0.72 | 30 | Good |
| Comparative Example | Absent Width 4 mm × thickness 0.5 mm × 1 piece | - | - | - | - | 1.9 | 18 | Bad |

FIG.16

| | Elongation rate | Vf | Fiber length | Compatibilizer | Twist | Heating temperature |
|---|---|---|---|---|---|---|
| Example 5 | 1.5% Torayca T300 | 50% | Continuous fiber | 6% | No | 250°C |
| Example 6 | 2.2% elongated CF Torayca T1000GB | 50% | Continuous fiber | 6% | No | 250°C |
| Example 7 | 1.5% | 20% | Continuous fiber | 6% | No | 250°C |
| Example 8 | 1.5% | 30% | Fiber length 0.1 mm or more and 3 mm or less | 6% | No | 250°C |
| Example 9 | 1.5% | 50% | Continuous fiber | 2% | No | 250°C |
| Example 10 | 1.5% | 50% | Continuous fiber | 6% | 45° twisted | 250°C |
| Example 11 | 1.5% | 50% | Continuous fiber | 6% | No | 280°C |
| Example 12 | 2.2% | 50% | Continuous fiber | 6% | No | 250°C |
| Example 13 | 1.5% | 20% | Continuous fiber | 6% | No | 250°C |
| Example 14 | 1.5% | 30% | Fiber length 0.1 mm or more and 3 mm or less | 6% | No | 250°C |
| Example 15 | 1.5% | 50% | Continuous fiber | 2% | No | 250°C |
| Example 16 | 1.5% | 50% | Continuous fiber | 6% | 45° twisted | 250°C |
| Example 17 | 1.5% | 50% | Continuous fiber | 6% | No | 280°C |
| Example 18 | 2.2% | 50% | Continuous fiber | 6% | No | 250°C |
| Example 19 | 1.5% | 20% | Continuous fiber | 6% | No | 250°C |
| Example 20 | 1.5% | 30% | Fiber length 0.1 mm or more and 3 mm or less | 6% | No | 250°C |
| Example 21 | 1.5% | 50% | Continuous fiber | 2% | No | 250°C |
| Example 22 | 1.5% | 50% | Continuous fiber | 6% | 45° twisted | 250°C |
| Example 23 | 1.5% | 50% | Continuous fiber | 6% | No | 280°C |
| Comparative Example | 1.5% | 50% | Continuous fiber | 6% | No | 250°C |

SHAPING APPARATUS

CROSS-REFERENCE TO RELATED APPLICATIONS

This application is based on and claims priorities under 35 USC 119 from Japanese Patent Application No. 2019-016249 filed on Jan. 31, 2019 and Japanese Patent Application No. 2019-200126 filed on Nov. 1, 2019.

BACKGROUND

Technical Field

The present invention relates to a shaping apparatus configured to deliver a shaping material.

Related Art

A shaping method and a shaping apparatus that shape an object using a shaping material are known (see, for example, Patent Literature 1 to Patent Literature 3).

In the device according to Patent Literature 3, a release film from a lower release film supply device having a long core having curvature disposed on a plane is delivered onto the core, and a prepreg sheet from a prepreg sheet supply device is laminated thereon and the laminate is preformed.

The release film from the release film supply device is covered on the laminate, and the covered laminate is delivered to a hot press device. A traction device delivers the covered laminate without applying tension. The covered laminate is thermally cured by an after cure device.

CITATION LIST

Patent Literature

Patent Literature 1: JP-B2-5482212
Patent Literature 2: JP-B2-3742082
Patent Literature 3: JP-B2-5429599

SUMMARY

Aspects of non-limiting embodiments of the present disclosure relates to provide a shaping apparatus in which a decrease in strength of a shaping material including continuous fibers is prevented when changing a applying direction of a shaping material, compared to a case where a delivery amount of the continuous fibers is constant in a width direction of the shaping material.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a shaping apparatus including: a stage; and a delivery unit configured to: deliver and apply a shaping material in which a plurality of continuous fibers is impregnated with a resin onto the stage; and, configured to change delivery amounts between an inner side and an outer side of a path of the shaping material according to a difference in path lengths between the inner side and the outer side, the difference being generated when an applying direction of the shaping material is changed.

BRIEF DESCRIPTION OF THE DRAWINGS

Exemplary embodiment(s) of the present invention will be described in detail based on the following figures, wherein:

FIG. 12 is a table showing comparison results between Examples and Comparative Examples;

FIG. 15 is an explanatory diagram showing Examples 5 to 23 and Comparative Example in a table;

FIG. 16 is an explanatory diagram showing conditions of Examples 5 to 23 and
Comparative Example in a table;

DETAILED DESCRIPTION

First Exemplary Embodiment

Figure 1:
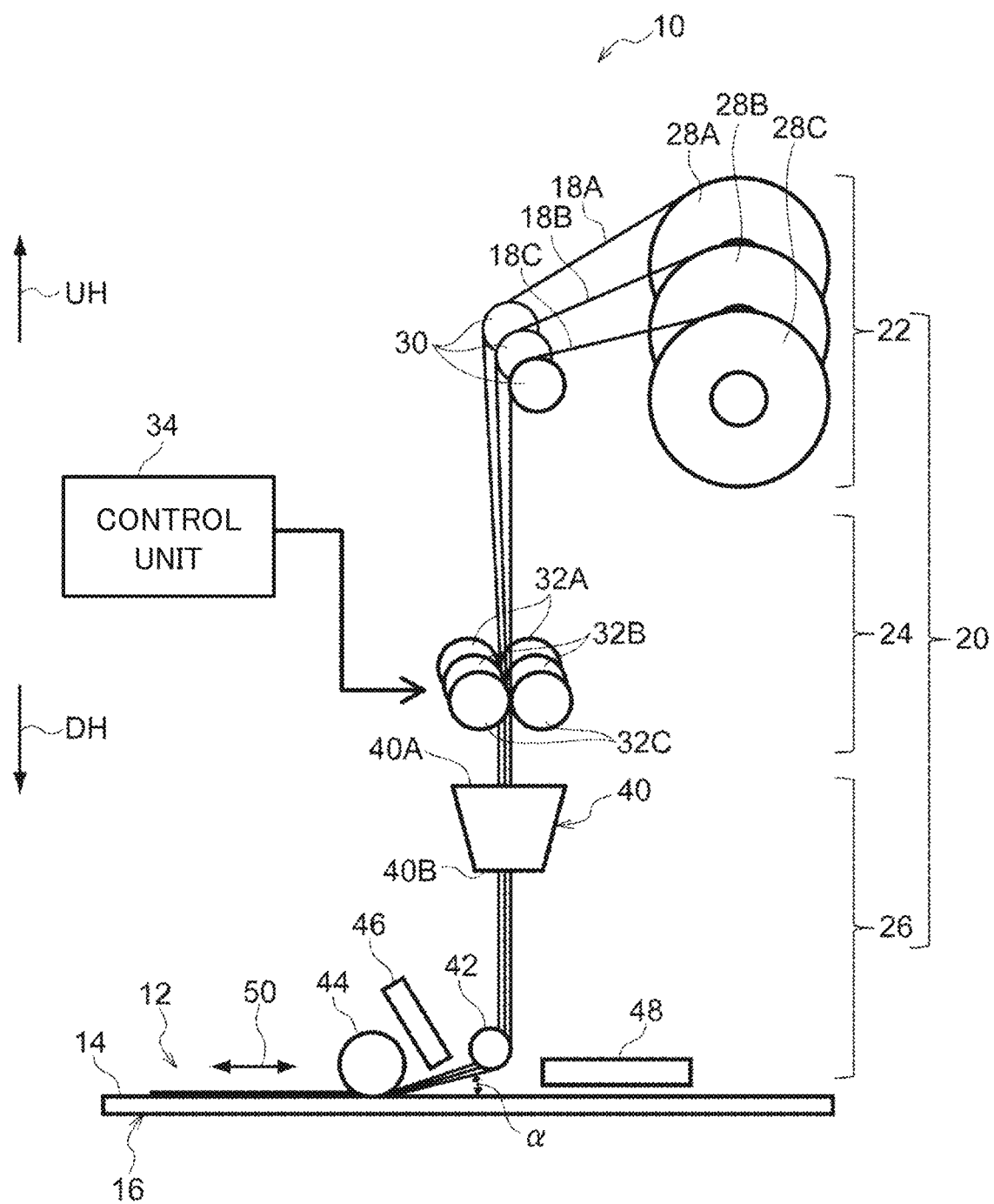
FIG. 1 is a schematic diagram showing a configuration of an overall shaping apparatus according to a first exemplary embodiment.

An example of a shaping apparatus according to a first exemplary embodiment will be described with reference to the drawings. In the drawings, an up direction is indicated by UH and a down direction is indicated by DH.

FIG. 1 is a diagram showing a shaping apparatus 10 according to the present exemplary embodiment, and the shaping apparatus 10 is a device configured to shape a three-dimensional object 12 based on shape data.

The shaping apparatus 10 includes a stage 16 having a shaping surface 14 for shaping the object 12 and a supply device 20 configured to supply a shaping material onto the stage 16.

"Stage"

The stage 16 is, for example, supported by a drive table (not shown). The drive table is configured to drive the stage 16 in X and Y directions (lateral directions), and a height direction (up direction UH and down direction DH), and is configured to rotate the stage 16 laterally, based on the shape data of the object 12. Accordingly, the object 12 is shaped on the shaping surface 14 after pieces of shaping material 18A, 18B, and 18C (A, B, and C attached to 18 may be omitted in the description when the shaping material is not specified) are delivered from the supply device 20 to the stage 16.

Although a case where the stage 16 is driven based on the shape data to shape the object 12 is described in the present exemplary embodiment, the present invention is not limited to the case. For example, the object 12 may be shaped by driving the supply device 20 with a manipulator based on the shape data.

"Supply Device"

The supply device 20 includes a shaping material supply unit 22 configured to supply the shaping material 18, a supply amount control unit 24 configured to control a supply amount of the shaping material 18 from the shaping material supply unit 22, and a shaping unit 26 configured to supply the shaping material 18 supplied from the supply amount control unit 24 onto the stage 16 to form the object 12.

(Shaping Material Supply Unit)

The shaping material supply unit 22 includes a first reel 28A on which the first shaping material 18A is wound, a second reel 28B on which the second shaping material 18B is wound, and a third reel 28C on which the third shaping material 18C is wound. The shaping material supply unit 22 includes a roller 30 configured to change a delivery direction of the pieces of shaping material 18A to 18C drawn from the reels 28A to 28C.

[Shaping Material]

The shaping material 18 includes a plurality of continuous fibers and a resin impregnated into the continuous fibers. Details of the shaping material 18 will be described later.

(Supply Amount Control Unit)

The supply amount control unit 24 includes a pair of first drawing rollers 32A configured to interpose and draw out the first shaping material 18A supplied from the first reel 28A, and a pair of second drawing rollers 32B configured to interpose and draw out the second shaping material 18B supplied from the second reel 28B. In addition, the supply amount control unit 24 includes a pair of third drawing rollers 32C configured to interpose and draw out the third shaping material 18C supplied from the third reel 28C.

The drawing rollers 32A to 32C are configured to be independently rotated by a drive unit (not shown), and a motor is an example of the drive unit.

The drive units configured to rotate the drawing rollers 32A to 32C are connected to a control unit 34. The control unit 34 adjusts an output to each of the drive units based on the shape data of the object 12 to be shaped, and individually controls a rotation speed of each of the drawing rollers 32A to 32C.

Accordingly, the control unit 34 adjusts a delivery amount of the pieces of shaping material 18A to 18C per unit time by the drawing rollers 32A to 32C. In other words, the control unit 34 controls supply amounts of the pieces of shaping material 18A to 18C from the reels 28A to 28C.

(Shaping Unit)

The shaping unit 26 includes a delivery unit 40 configured to deliver the pieces of shaping material 18A to 18C supplied from the supply amount control unit 24, and an angle changing roller 42 configured to change a supply direction of each of the pieces of shaping material 18A to 18C from the delivery unit 40. In addition, the shaping unit 26 includes a pressure roller 44 configured to pressurizes the pieces of shaping material 18A to 18C, which are supplied via the angle changing roller 42 and are disposed side by side, in the down direction DH to the stage 16.

Further, the shaping unit 26 includes a first heating unit 46 and a second heating unit 48 configured to heat the pieces of shaping material 18A to 18C supplied to the pressure roller 44 to a temperature equal to or higher than a melting point of the resin of the pieces of shaping material 18A to 18C.

[Delivery Unit]

Figure 2:
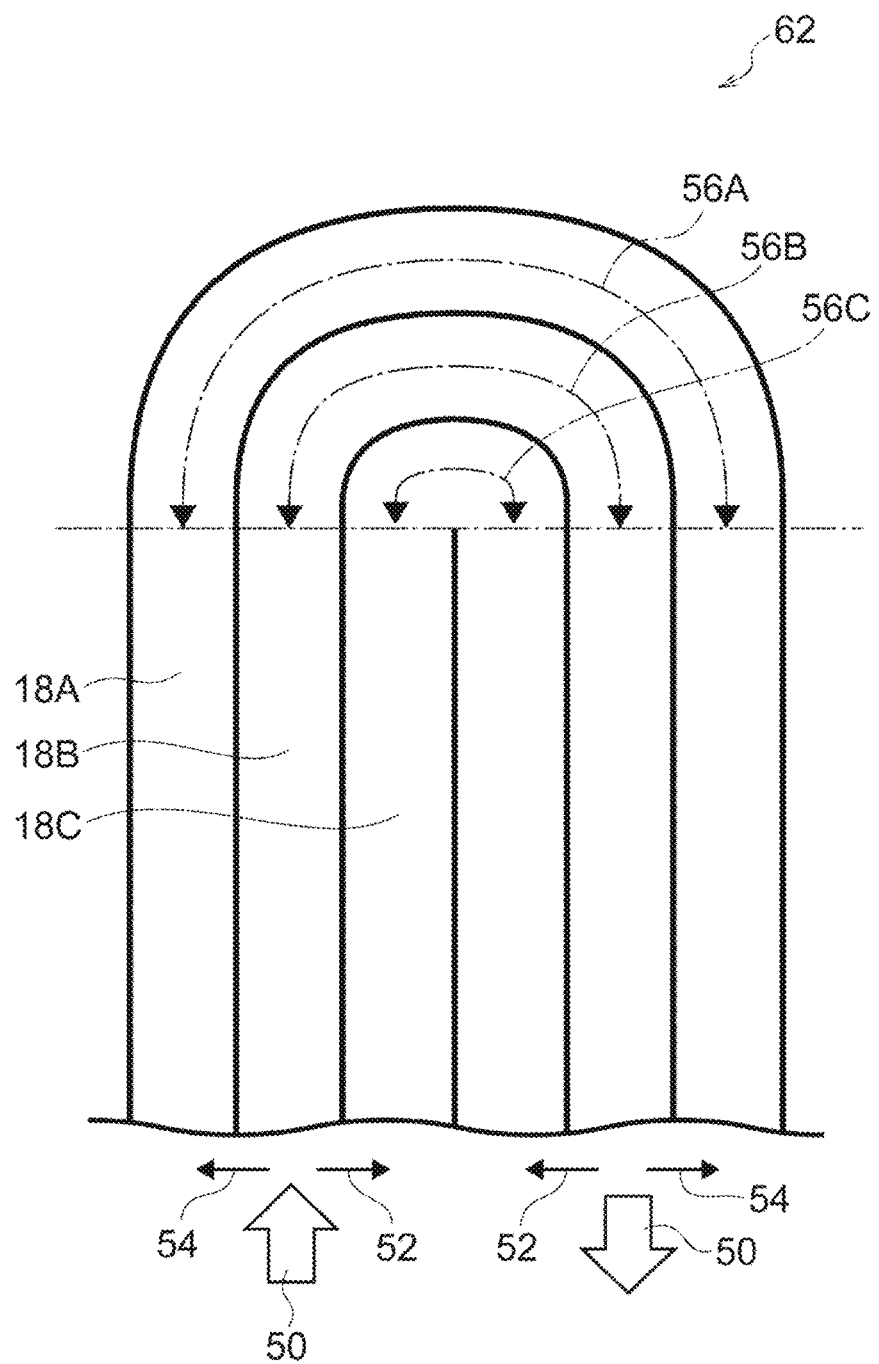
FIG. 2 is an explanatory diagram showing a shaping material applied by the shaping apparatus according to the first exemplary embodiment.

The delivery unit 40 is configured to deliver the pieces of shaping material 18A to 18C onto the stage 16 for applying. As shown in FIG. 2, when changing a applying direction 50 of the pieces of shaping material 18A to 18C, the delivery unit 40 delivers the pieces of shaping material 18A to 18C having the delivery amount changed between an inner side 52 and an outer side 54 according to a difference in path lengths 56A to 56C generated between the inner side 52 and the outer side 54. In other words, the delivery amount of the continuous fibers included in each of the pieces of shaping material 18A to 18C is changed between the inner side 52 and the outer side 54.

Here, changing the applying direction 50 includes, for example, turning back the applying direction 50 or bending the applying direction 50.

As shown in FIG. 1, the delivery unit 40 is configured with a tapered nozzle. An upper surface 40A are formed with insertion holes (not shown) into which the pieces of shaping material 18A to 18C drawn from the reels 28A to 28C are inserted. In addition, as shown in FIG. 3, a lower surface 40B of the delivery unit 40 is formed with an ejection port 58 configured to eject the pieces of shaping material 18A to 18C side by side.

The ejection port 58 is wide in an intersection direction 60 intersecting the applying direction 50 along which the pieces of shaping material 18A to 18C are applied. In other words, the ejection port 58 is formed in a rectangular shape in which a vertical dimension in the applying direction 50 is long and a horizontal dimension in the intersection direction 60 is long.

Figure 3:
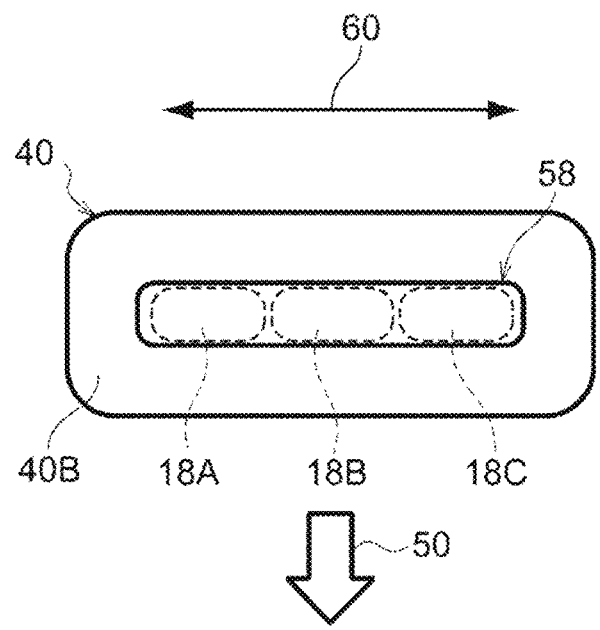
FIG. 3 is an explanatory diagram showing an ejection port of the shaping apparatus according to the first exemplary embodiment.

The first shaping material 18A from the first reel 28A is delivered from a left side of the ejection port 58 in a width direction in FIG. 3, and the second shaping material 18B from the second reel 28B is delivered from a central portion of the ejection port 58 in the width direction. Further, the third shaping material 18C from the third reel 28C is delivered from a right side of the ejection port 58 in the width direction in FIG. 3.

The supply amount of the pieces of shaping material 18A to 18C supplied to the delivery unit 40 per unit time is controlled based on the shape data of the object 12 to be shaped. The supply amount of the continuous fibers included in the pieces of shaping material 18A to 18C per unit time is controlled.

Specific description will be made with reference to FIG. 2. That is, when the applying direction 50 of the pieces of shaping material 18A to 18C is changed based on the shape data and folded back on a plane, the first path length 56A of the first shaping material 18A located at the outer side 54 of a folded portion 62 is longer than the second path length 56B of the second shaping material 18B located at the inner side thereof. In addition, at the folded portion 62, the second path length 56B of the second shaping material 18B is longer than the third path length 56C of the third shaping material 18C located at the inner side thereof.

Then, the control unit 34 grasps the path lengths 56A to 56C of the pieces of shaping material 18A to 18C based on the shape data before changing the applying direction.

Therefore, the control unit 34 controls rotation speeds of the drawing rollers 32A to 32C based on the path lengths 56A to 56C of the pieces of shaping material 18A to 18C grasped before changing the applying direction and applying speeds of the pieces of shaping material 18A to 18C.

For example, the rotation speed of the first drawing roller 32A is made faster than that of the second drawing roller 32B, and the rotation speed of the second drawing roller 32B is made faster than the rotation speed of the third drawing roller 32C.

Accordingly, the supply amount of the pieces of shaping material 18A to 18C per unit time is adjusted according to the difference in the path lengths 56A to 56C generated between the inner side 52 and the outer side 54 in the folded portion 62, and the delivery amount of the continuous fibers included in the pieces of shaping material 18A to 18C is changed between the inner side 52 and the outer side 54.

[Angle Changing Roller]

As shown in FIG. 1, the angle changing roll 42 is set such that an angle α formed by the pieces of shaping material 18A to 18C supplied from the delivery unit 40 to the pressure roller 44 with respect to the shaping surface 14 is an acute angle, and the angle α is 15 degrees or more and 45 degrees or less.

[Heating Unit]

The first heating unit 46 heats the pieces of shaping material 18A to 18C from the up direction UH side between the angle changing roll 42 and the pressure roller 44, and heats a portion on a peripheral surface of the pieces of shaping material 18A to 18C located on a side opposite to the shaping surface 14. The second heating unit 48 heats the pieces of shaping material 18A to 18C from a side direction between the angle changing roll 42 and the pressure roller 44, and heats a portion on the peripheral surface of the pieces of shaping material 18A to 18C located on a shaping surface 14 side.

Accordingly, the pieces of shaping material 18A to 18C are heated from both surfaces in a lamination direction, and the joining of the adjacent pieces of shaping material 18A to 18C is promoted.

Examples of the first heating unit 46 and the second heating unit 48 include heating means configured to heat the pieces of shaping material 18A to 18C. Examples of the heating means include a hot air supply device configured to heat the pieces of shaping material 18A to 18C by applying hot air, a laser device configured to heat the pieces of shaping material 18A to 18C by irradiating the same with a laser beam, and a heater configured to heat the pieces of shaping material 18A to 18C by applying radiant heat. An example of the heater is a halogen heater.

[Pressure Roller]

The pressure roller 44 is formed in a cylindrical shape, and pressurizes and crushes the pieces of shaping material 18A to 18C, in which the resin is melted by the heating units 46 and 48, toward the stage 16. Accordingly, the pieces of shaping material 18A to 18C are flattened and sandwiched between the shaping surface 14 and fixed. Further, in a position where the pieces of shaping material 18A to 18C are laminated, the bonding between the upper and lower pieces of shaping material 18A to 18C is strengthened.

Accordingly, the pieces of shaping material 18A to 18C supplied from the supply amount control unit 24 are supplied onto the stage 16, and the object 12 is shaped based on shaping data.

Second Exemplary Embodiment

Figure 4:
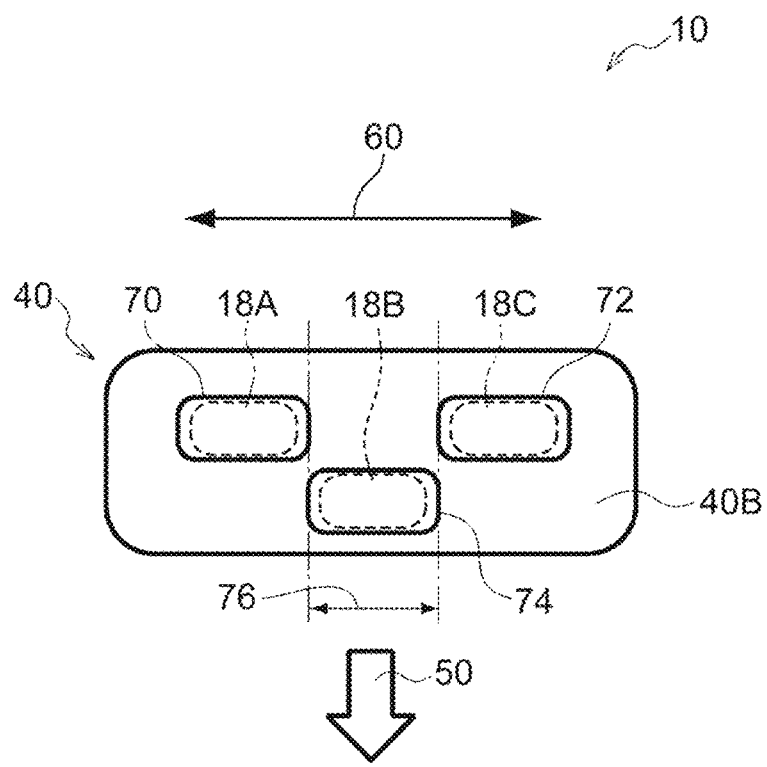
FIG. 4 is an explanatory diagram showing an ejection port of a shaping apparatus according to a second exemplary embodiment.

FIG. 4 is a diagram showing the shaping apparatus 10 according to a second exemplary embodiment. The same or equivalent parts as those in the first exemplary embodiment are denoted by the same reference numerals and the description thereof is omitted, and only different parts are described.

The shaping apparatus 10 of the present exemplary embodiment is different from the first exemplary embodiment in the ejection port formed in the delivery unit 40.

[Delivery Unit]

The lower surface 40B of the delivery unit 40 is formed with a plurality of ejection ports configured to eject the pieces of shaping material 18A to 18C. The ejection ports include a first ejection port 70 and a second ejection port 72 disposed side by side in the intersection direction 60 intersecting the applying direction 50.

In addition, the lower surface 40B of the delivery unit 40 is formed with a separate line ejection port 74 configured to eject the second shaping material 18B from a position shifted in the applying direction 50 from the line of the ejection ports 70 and 72 disposed in the intersection direction 60. Further, the separate line ejection port 74 is disposed in a region 76 passing through between the adjacent first ejection port 70 and second ejection ports 72 and extending in the applying direction 50.

The separate line ejection port 74 is, for example, disposed at an upstream side in the applying direction 50, but is not limited thereto, and may be disposed at a downstream side in the applying direction 50. Further, a plurality of separate line ejection ports 74 may be provided.

Third Exemplary Embodiment

Figure 5:
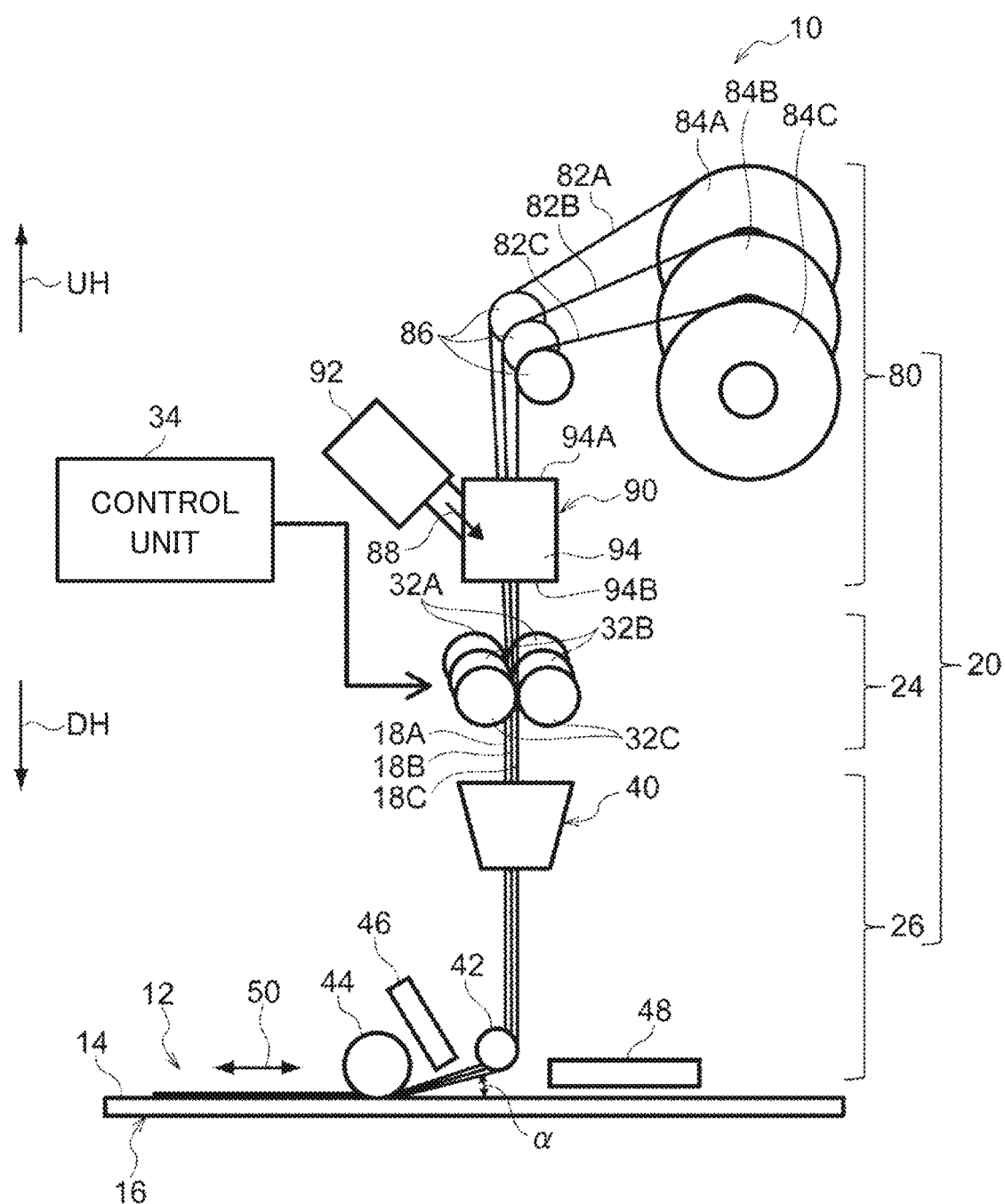
FIG. 5 is a schematic diagram showing a configuration of an overall shaping apparatus according to a third exemplary embodiment.
Figure 6:
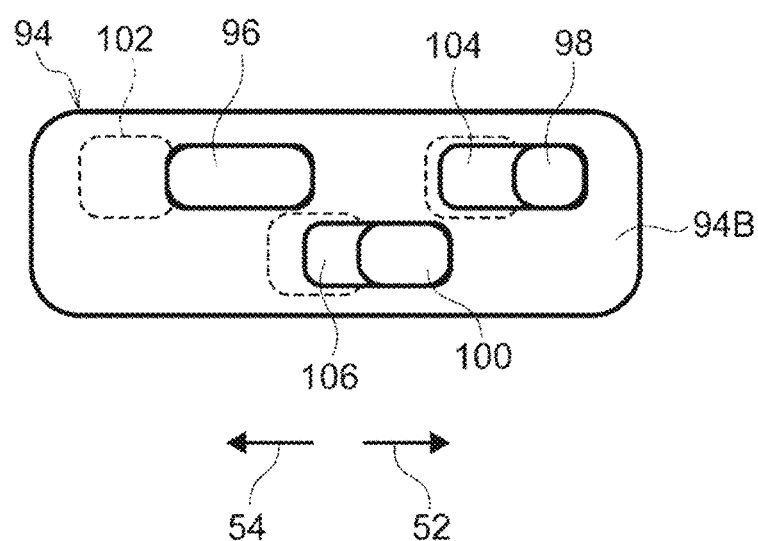
FIG. 6 is an explanatory diagram showing a delivery hole of an impregnation unit of the shaping apparatus according to the third exemplary embodiment.
Figure 7:
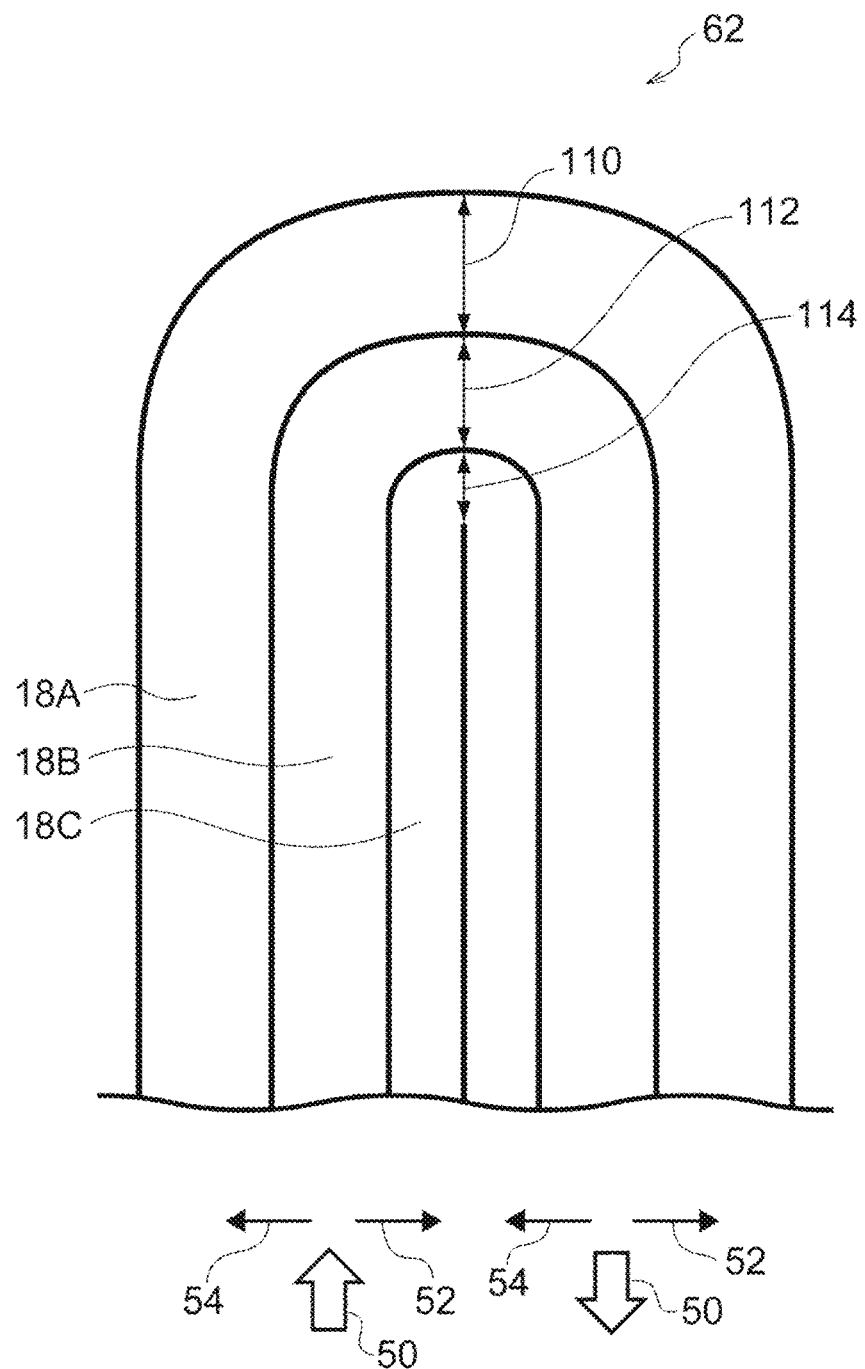
FIG. 7 is an explanatory diagram showing a shaping material applied by the shaping apparatus according to the third exemplary embodiment.

FIGS. 5 to 7 are a diagram showing the shaping apparatus 10 according to a third exemplary embodiment. The same or equivalent parts as those in the first and second exemplary embodiments are denoted by the same reference numerals and the description thereof is omitted, and only different parts are described.

The shaping apparatus 10 of the present exemplary embodiment is different from the first and second exemplary embodiments in the structure of the shaping material supply unit.

(Shaping Material Supply Unit)

As shown in FIG. 5, a shaping material supply unit 80 includes a first reel 84A on which first continuous fibers 82A are wound and a second reel 84B on which second continuous fibers 82B are wound. In addition, the shaping material supply unit 80 includes a third reel 84C on which third continuous fibers 82C are wound and a roller 86 configured to change the delivery direction of the respective continuous fibers 82A to 82C drawn from the respective reels 84A to 84C. Further, the shaping material supply unit 80 includes an impregnation unit 90 configured to impregnate the continuous fibers 82A to 82C with a resin 88 to form the pieces of shaping material 18A to 18C.

(Continuous Fiber)

Each of the continuous fibers 82A to 82C is composed of a plurality of wire materials. The wire material of each of the continuous fibers 82A to 82C is, for example, composed of a carbon fiber. Compared to a case of using a shaping material in which a continuous fiber is impregnated with a resin, the reel to be wound with the continuous fiber may be reduced in diameter, and size reduction is achieved.

Although a case where the wire material of each of the continuous fibers 82A to 82C is composed of a carbon fiber is described in the present exemplary embodiment, the present invention is not limited to this. The wire material may be composed of a glass fiber. A single continuous fiber F (reference numeral given in a case of indicating a single continuous fiber is "F") constituting each of the continuous fibers 82A to 82C has a diameter of 5 μm to 30 μm, and the continuous fiber F is drawn from the reels 84A to 84C in a state where hundreds to tens of thousands of continuous fibers F are bundled.

(Impregnation Unit)

The impregnation unit 90 includes a resin supply unit 92 that is filled with the resin 88 and a cylindrical casing 94 to which the resin 88 is supplied from the resin supply unit 92. Examples of the resin 88 supplied from the resin supply unit 92 include a thermoplastic resin. This resin 88 is made of, for example, melted PP (polypropylene), and the melting point of PP is about 160° C.

Although a case where PP is used as the resin 88 is described in the present exemplary embodiment, the present invention is not limited to this. For example, PA (polyamide (nylon)), PPS (polystyrene), PC (polycarbonate), PEEK (polyetheretherketone), PEI (polyetherimide), PA6 (polyamide 6 (nylon 6)), and PA11 (polyamide 11) may be used as the resin.

The continuous fibers 82A to 82C are inserted from an upper surface 94A of the casing 94. When the bundled continuous fibers F pass through the casing 94, the resin 88 is impregnated between the continuous fibers F to form a linear shaping material. Accordingly, in other words, the pieces of shaping material 18A to 18C to be formed may be referred as fiber reinforced resins in which the resin is reinforced with the continuous fibers.

As shown in FIG. 6, the lower surface 94B of the casing 94 is formed with a first delivery hole 96 corresponding to the first ejection port 70 of the delivery unit 40, a second delivery hole 98 corresponding to the second ejection port 72 of the delivery unit 40, and a third delivery hole 100 corresponding to the separate line ejection port 74 of the delivery unit 40. Each of the delivery holes 96 to 100 is formed in a rectangular shape.

The first delivery hole 96 is slidably provided with a first shutter 102 configured to change an opening width of the first delivery hole 96. The second delivery hole 98 is slidably provided with a second shutter 104 configured to change an opening width of the second delivery hole 98. The third delivery hole 100 is slidably provided with a third shutter 106 configured to change an opening width of the third delivery hole 100.

Each of the shutters 102 to 106 is configured to open and close in response to a signal from the control unit 34. The control unit 34 adjusts the opening width of the respective delivery holes 96 to 100 by operating the respective shutters 102 to 106.

Accordingly, when changing the applying direction 50 of the pieces of shaping material 18A to 18C based on the shape data of the object 12, the control unit 34 makes the third shaping material 18C disposed at the inner side 52 thinner than the first shaping material 18A disposed at the outer side 54, for example, as shown in FIG. 7.

At this time, amounts of the resin 88 impregnated in the continuous fibers 82A to 82C are substantially the same. Therefore, when changing the applying direction 50, a content of the resin 88 in the third shaping material 18C disposed at the inner side 52 is greater than a content of the resin 88 in the first shaping material 18A disposed at the outer side 54.

In other words, the third shaping material 18C disposed at the inner side 52 has a low density of continuous fibers (sparse), and the first shaping material 18A disposed at the outer side 54 has a high density of continuous fibers (dense).

The pieces of shaping material 18A to 18C delivered from the delivery holes 96 to 100 are drawn from the impregnation unit 90 by the drawing rollers 32A to 32C of the supply amount control unit 24, and ejected from the ejection ports 70 to 74 corresponding to the delivery unit 40. That is, when changing the applying direction 50, in the delivery unit 40, the third shaping material 18C from the second ejection port 72 located at the inner side 52 is made thinner than the first shaping material 18A from the first ejection port 70 located at the outer side 54.

Accordingly, a third width dimension 114 of the third shaping material 18C disposed at the inner side 52 of the folded portion 62 is narrower than a second width dimension 112 of the second shaping material 18B disposed at the outer side 54 thereof. In addition, the second width dimension 112 of the second shaping material 18B is narrower than a first width dimension 110 of the first shaping material 18A disposed at the outer side 54 thereof.

In the delivery unit 40, when changing the applying direction 50, the content of the resin 88 in the third shaping material 18C from the second ejection port 72 located at the inner side 52 is made more than the content of the resin 88 in the first shaping material 18A from the first ejection port 70 located at the outer side 54.

Fourth Exemplary Embodiment

Figure 8:
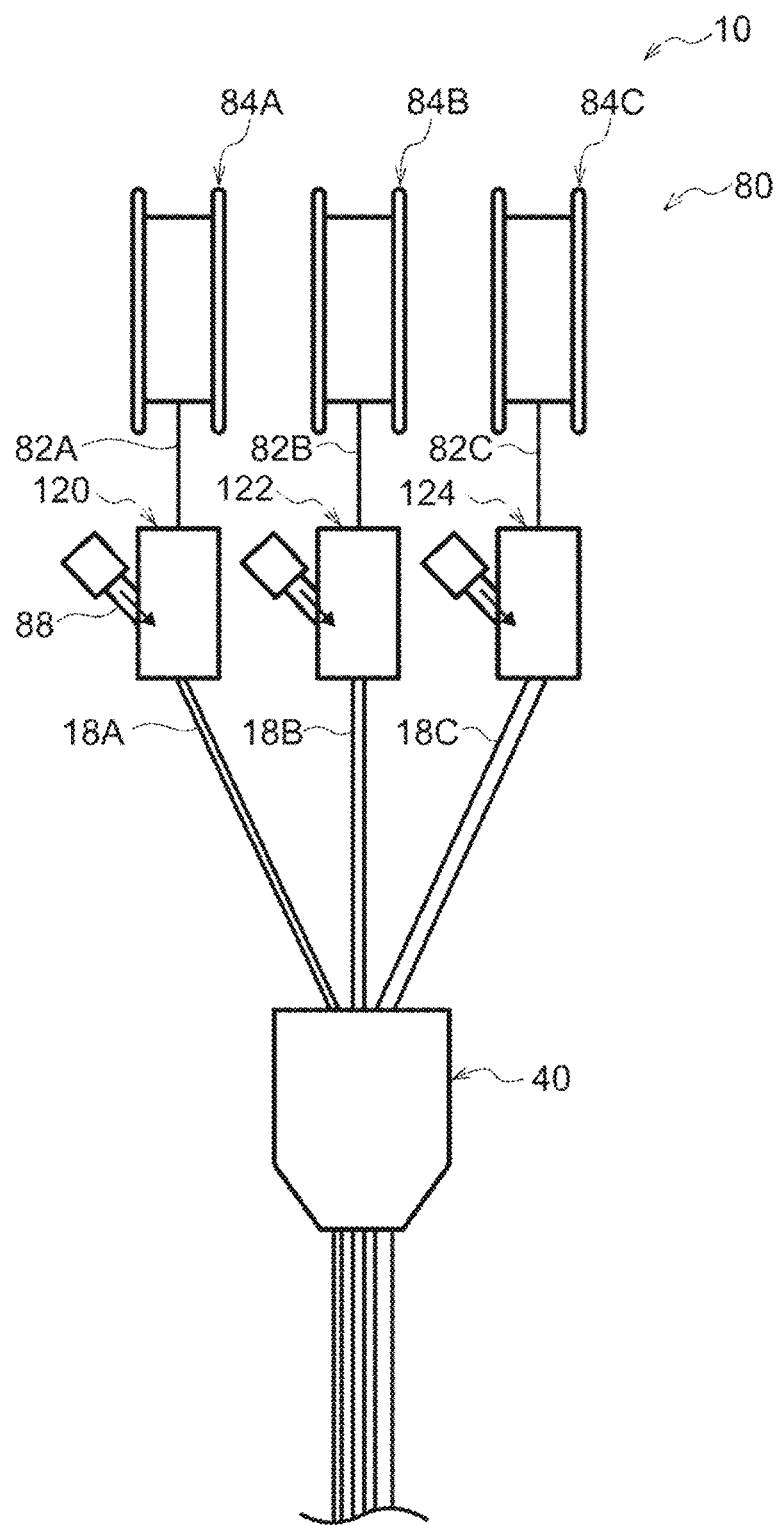
FIG. 8 is an explanatory diagram showing main parts of a shaping apparatus according to a fourth exemplary embodiment.

FIG. 8 is a diagram showing the shaping apparatus 10 according to a fourth exemplary embodiment. The same or equivalent parts as those in the first exemplary embodiment to the third exemplary embodiment are denoted by the same reference numerals and the description thereof is omitted, and only different parts are described.

The shaping apparatus 10 of the present exemplary embodiment is different from the third exemplary embodiment in the structure of the shaping material supply unit 80.

(Shaping Material Supply Unit)

That is, the impregnation unit of the shaping material supply unit 80 includes a first impregnation unit 120 configured to impregnate the first continuous fiber 82A with the resin 88 to form the first shaping material 18A, and a second impregnation unit 122 configured to impregnate the second continuous fiber 82B with the resin 88 to form the second shaping material 18B. In addition, the impregnation unit of the shaping material supply unit 80 includes a third impregnation unit 124 configured to impregnate the third continuous fiber 82C with the resin 88 to form the third shaping material 18C.

The impregnation units 120 to 124 are configured to change an opening width of a delivery port (not shown) formed in the lower surface and change the percentage of the resin 88. When changing the applying direction 50 of the pieces of shaping material 18A to 18C based on the shape data of the object 12, the control unit 34 connected to the impregnation units 120 to 124 makes, for example, the third shaping material 18C disposed at the inner side 52 thinner than the first shaping material 18A disposed at the outer side 54.

Accordingly, as shown in FIG. 7, the third width dimension 114 of the third shaping material 18C disposed at the inner side 52 of the folded portion 62 is narrower than the second width dimension 112 of the second shaping material 18B disposed at the outer side 54 thereof. In addition, the second width dimension 112 of the second shaping material 18B is narrower than the first width dimension 110 of the first shaping material 18A disposed at the outer side 54 thereof.

Fifth Exemplary Embodiment

Figure 9:
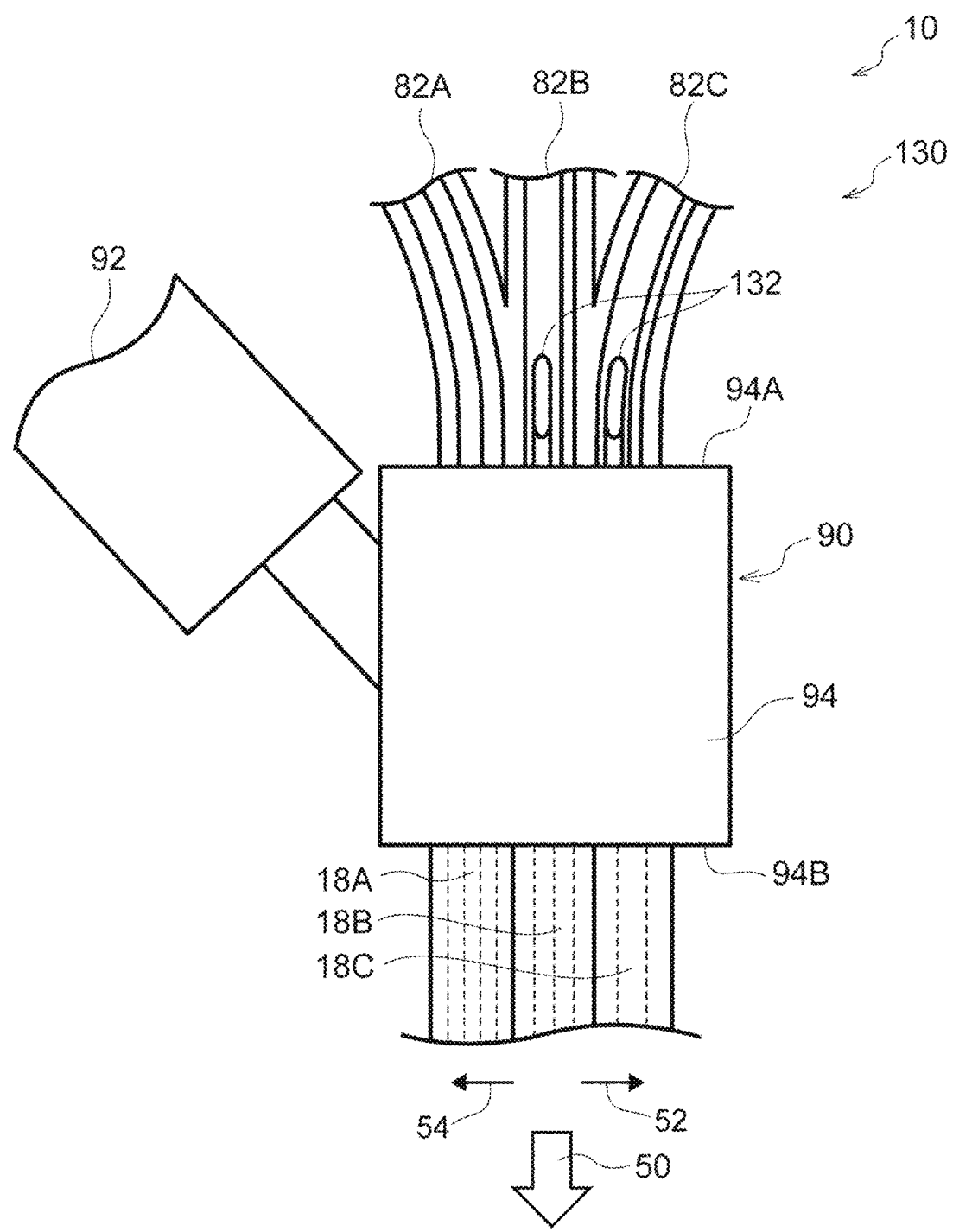
FIG. 9 is an explanatory diagram showing main parts of a shaping apparatus according to a fifth exemplary embodiment.
Figure 10:
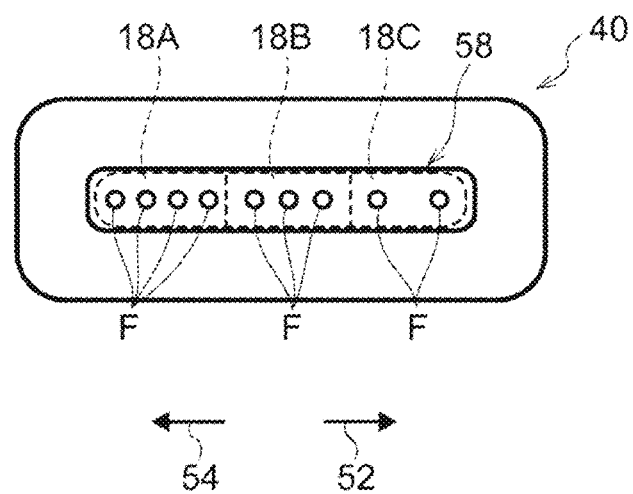
FIG. 10 is an explanatory diagram showing a shaping material ejected from an ejection port of the shaping apparatus according to the fifth exemplary embodiment.
Figure 11:
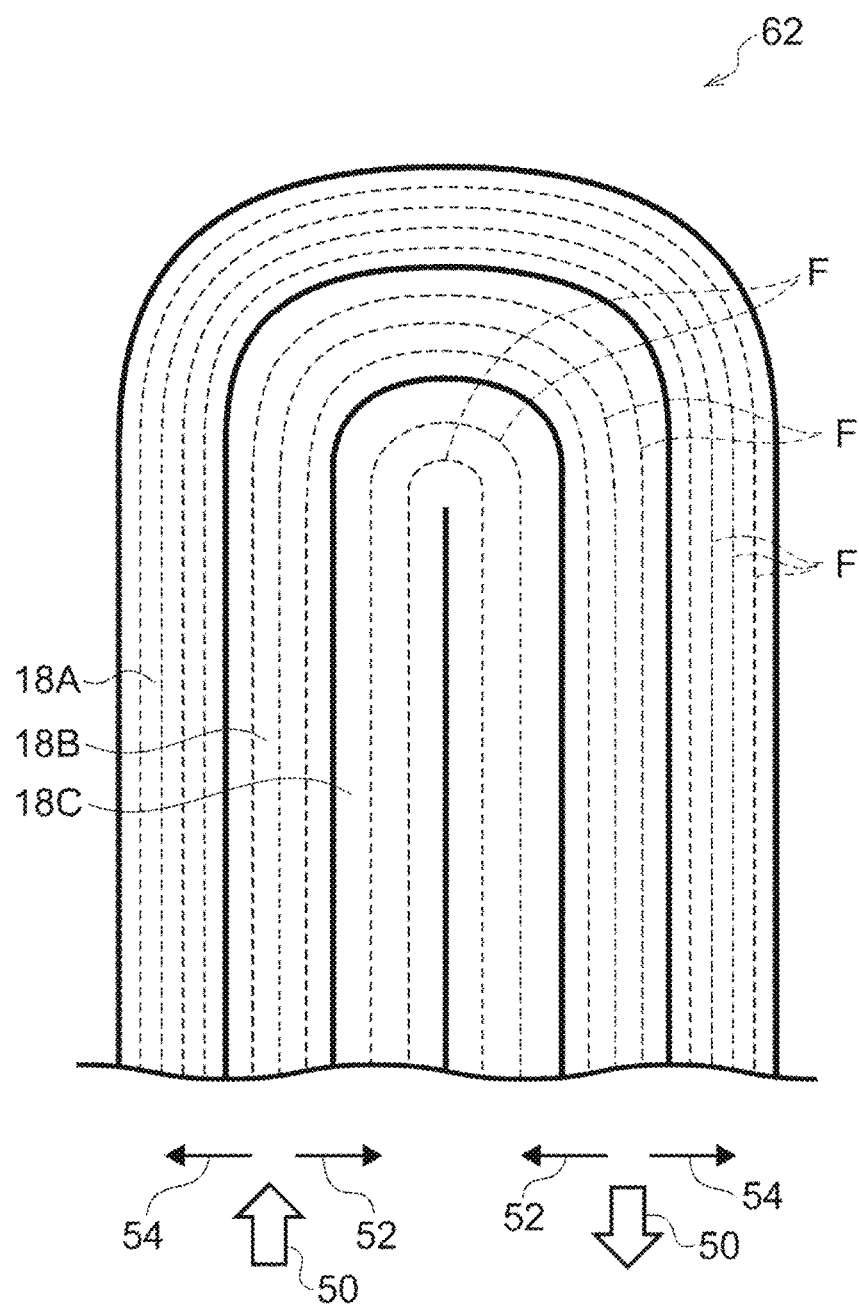
FIG. 11 is an explanatory diagram showing a shaping material applied by the shaping apparatus according to the fifth exemplary embodiment.

FIGS. 9 to 11 are a diagram showing the shaping apparatus 10 according to a fifth exemplary embodiment. The same or equivalent parts as those in third exemplary embodiment are denoted by the same reference numerals and the description thereof is omitted, and only different parts are described.

The shaping apparatus 10 of the present exemplary embodiment is different from the third exemplary embodiment in the structure of the shaping material supply unit.

(Shaping Material Supply Unit)

As shown in FIG. 9, the shaping material supply unit 130 includes partition plates 132 inserted between the continuous fibers 82A to 82C drawn from the reels 84A to 84C and configured to partition the plurality of continuous fibers F that are bundled. Each of the partition plates 132 are driven by a drive unit (not shown).

Each drive unit is connected to the control unit 34. The control unit 34 controls the insertion of each of the partition plates 132 into the continuous fibers F and insertion positions of the partition plates 132 in the width direction based on the shape data of the object 12. Accordingly, the continuous fibers 82A to 82C are supplied to the impregnation unit 90 for respective continuous fibers partitioned by the partition plates 132, and the impregnation unit 90 is impregnated with the resin 88 to form the pieces of shaping material 18A to 18C.

Specifically, when changing the applying direction 50 of the pieces of shaping material 18A to 18C based on the shape data, the control unit 34 makes, for example, the number of the continuous fibers F forming the third shaping material 18C disposed at the inner side 52 smaller than the number of the continuous fibers F forming the first shaping material 18A disposed at the outer side 54.

The pieces of shaping material 18A to 18C formed by the impregnation unit 90 is delivered to the delivery unit 40 and is ejected from the ejection port 58 of the delivery unit 40 as shown in FIG. 10.

Accordingly, when changing the applying direction, for example, as shown in FIG. 11, in the delivery unit 40, the number of the continuous fibers F of the third shaping material 18C from a portion of the ejection port 58 located at the inner side 52 is made smaller than the number of the continuous fibers F of the first shaping material 18A from a portion of the ejection port 58 located at the outer side 54.

The pieces of shaping material 18A to 18C are impregnated with substantially the same amount of resin 88. Therefore, when changing the applying direction 50, in the delivery unit 40, the percentage of the continuous fibers included in the third shaping material 18C from the ejection port 58 located at the inner side 52 is made smaller than the percentage of the continuous fibers included in the first shaping material 18A from the ejection port 58 located at the outer side 54.

When changing the applying direction 50 of the pieces of shaping material 18A to 18C, the delivery amount of the continuous fibers 82A to 82C is changed between the inner side 52 and the outer side 54 according to the difference in the path lengths generated between the inner side 52 and the outer side 54, and a transport speed adjusting device with a buffering function for delivery may be incorporated in the impregnation unit 90.

(Comparative Test)

FIG. 12 is a table showing comparison results between Examples and Comparative Examples.

The shaping material to be applied has a width dimension of 4 mm and a thickness dimension of 0.5 mm, and the shaping material having continuous fibers included in a reference shaping material in a percentage Vf of 50% is turned 180 degrees. The appearance quality at the folded portion is evaluated.

In Example 1, a plurality of pieces of shaping material are used for shaping, a shaping material wound around the reel is used, and an impregnation unit configured to impregnate the continuous fibers with a resin is not included. The thickness and Vf of the shaping material are not changed at the inner side and outer side of the folded portion.

In Example 2, a plurality of pieces of shaping material are used for shaping, the continuous fiber wound around the reel is made of carbon fiber, and the impregnation unit is included. The thickness and Vf of the shaping material are not changed at the inner side and outer side of the folded portion.

In Example 3, a plurality of pieces of shaping material are used for shaping, the continuous fiber wound around the reel is made of carbon fiber, and the impregnation unit is included. At the folded portion, the thickness of the shaping material at the inner side is reduced, but Vf is not changed.

In Example 4, a plurality of pieces of shaping material are used for shaping, the continuous fiber wound around the reel is made of carbon fiber, and the impregnation unit is included. At the folded portion, the thickness of the shaping material is not changed at the inner side and the outer side, but Vf is increased at the outer side.

In Comparative Example, a single shaping material is used for shaping, and a shaping material wound around the reel is used. The impregnation unit is not included.

From the test results, wrinkles or cuts occurred at the folded portion in Comparative Example, while wrinkles or cuts are not found and the appearance quality is high in Examples.

In the above exemplary embodiments, a case where the thickness and Vf (the percentage of the continuous fibers F included in the shaping material 18) are changed at the first shaping material 18A disposed at the outer side and the third shaping material 18C disposed at the outer side in the folded portion 62 is described, but the present invention is not limited to this.

Sixth Exemplary Embodiment

Figure 13:
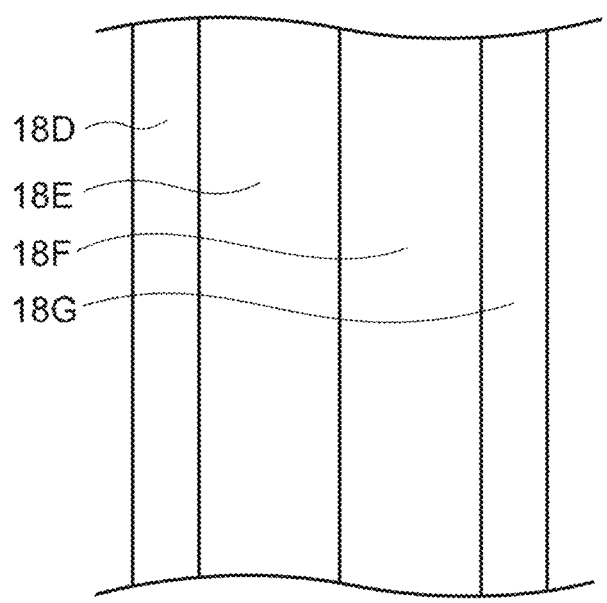
FIG. 13 is an explanatory diagram showing a shaping material according to a sixth exemplary embodiment.

FIG. 13 is a diagram showing the shaping material 18 according to a sixth exemplary embodiment. In the shaping material 18, the thickness of a fourth shaping material 18D and a seventh shaping material 18G disposed at the outer side is thinner than that of a fifth shaping material 18E and a sixth shaping material 18F disposed at the inner side.

Seventh Exemplary Embodiment

Figure 14:
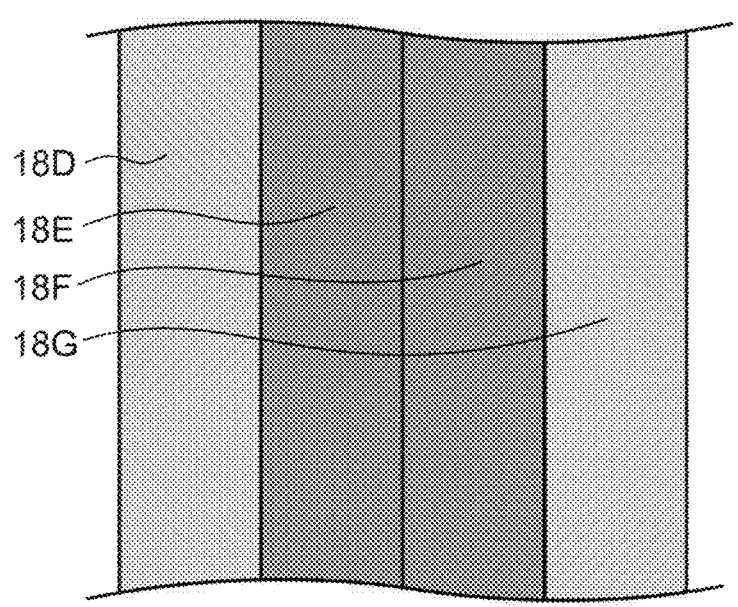
FIG. 14 is an explanatory diagram showing a shaping material according to a seventh exemplary embodiment.

FIG. 14 is a diagram showing the shaping material 18 according to a seven exemplary embodiment. In the shaping material 18, Vf (ratio of the continuous fibers F included in the shaping material 18) of the fourth shaping material 18D and the seventh shaping material 18G disposed at the outer side is lower than that of the fifth shaping material 18E and the sixth shaping material 18F disposed at the inner side.

In the seventh exemplary embodiment, Vf (ratio of the continuous fibers F included in the shaping material 18) of the fourth shaping material 18D and the seventh shaping material 18G disposed at the outer side is lower than that of the fifth shaping material 18E and the sixth shaping material 18F disposed at the inner side. However, the present invention is not limited to this.

For example, in a case of a single shaping material, the Vf (ratio of the continuous fibers F included in the shaping material 18) may be continuously changed to decrease from the inner side to the outer side.

Examples

FIGS. 15 to 18 are diagrams showing Examples. FIGS. 15 and 16 show Example 5 to Example 23 and Comparative Example.

(Common Matters)

In Examples and Comparative Example, respective pieces of shaping material were bent in a 90° direction while drawing an arc having a radius of 5 mm, and a curve was shaped for evaluation. As evaluation items, evaluation based on electric resistance values ($\Delta R/\Delta R1$) and evaluation on flexural modulus were performed.

The electrical resistance value is represented by the electrical resistance value=($\Delta R/\Delta R1$) where R1 is the resistance value of the straight portion of the shaping material, R2 is the resistance value of the curved portion, and $\Delta R$= (R2−R1).

Figure 17:
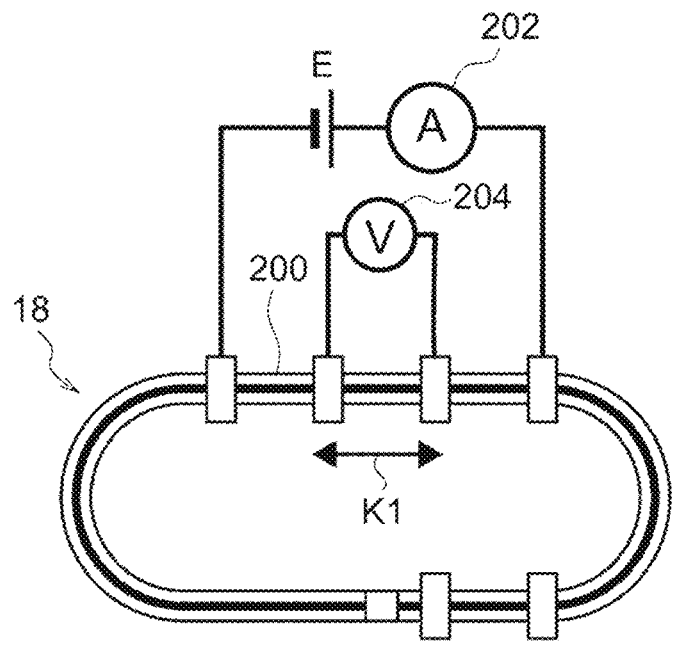
FIG. 17 is an explanatory diagram showing a state where a resistance value of a straight portion of the shaping material is measured.

For the measurement of the resistance value R1 of the straight portion of the shaping material, as shown in FIG. 17, a specified voltage E was applied to a straight portion 200 of the shaping material 18 via an ammeter 202. During voltage application, a voltage at a position separated by a specified distance K1 was measured by a voltmeter 204. Then, the resistance value R1 was obtained based on the voltage value measured by the voltmeter 204, the current value measured by the ammeter 202, and the specified distance K1.

Figure 18:
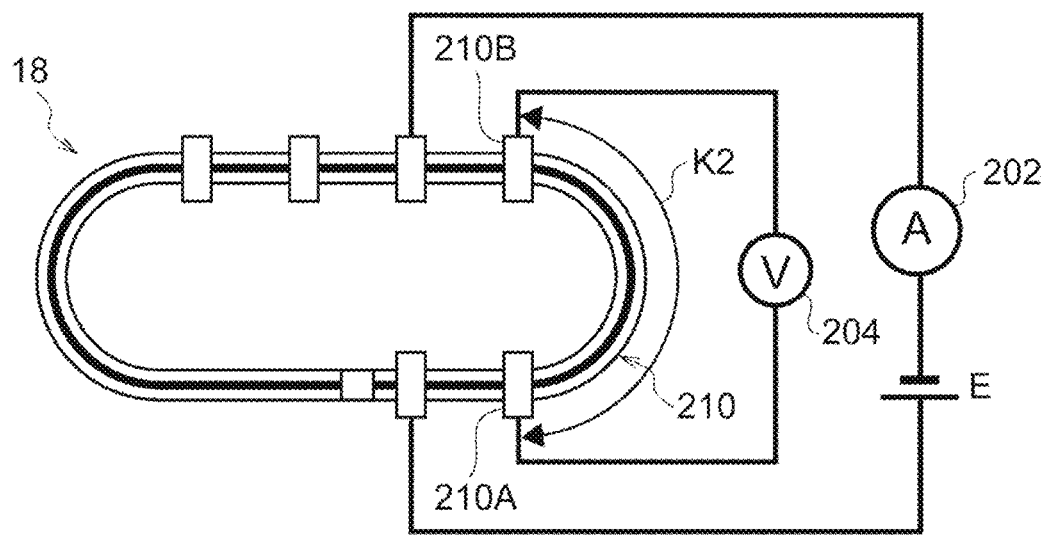
FIG. 18 is an explanatory diagram showing a state where a resistance value of a curved portion of the shaping material is measured.

For the measurement of the resistance value R2 of the curved portion of the shaping material 18, as shown in FIG. 18, a specified voltage E was applied via the ammeter 202 so as to sandwich a curved portion 210 of the shaping material 18. During voltage application, the voltage between a start point 210A and an end point 210B of the curved portion 210 was measured by the voltmeter 204. The start point 210A and the end point 210B of the curved portion 210 were separated by a specified distance K2.

Then, the resistance value R2 was obtained based on the voltage value measured by the voltmeter 204, the current value measured by the ammeter 202, and the specified distance K2.

FIG. 18 shows a state where the shaping material 18 is U-turned, but the resistance value R2 is measured at a location matching the curved portion 210 of the exemplary embodiment.

In the evaluation of the electric resistance value ($\Delta R/\Delta R1$), it is determined that the evaluation standard is satisfied when ($\Delta R/\Delta R1$)≤1. In the evaluation of the flexural modulus, it is determined that the evaluation standard is satisfied when the flexural modulus ≥20 Pa. When the evaluation of the electrical resistance value ($\Delta R/\Delta R1$) and the evaluation of the flexural modulus were satisfied, the determination result was good and indicated by a circle.

Example 5

In Example 5, a reference shaping material was used. The continuous fiber of the shaping material was Torayca (registered trademark: the same applies hereinafter) T300 manufactured by Toray Industries, Inc., and the elongation rate of the continuous fiber was 1.5%. The continuous fiber was used without being cut and was not twisted.

The Vf of the shaping material (ratio of the continuous fiber included in the shaping material: the same applies hereinafter) was 50%, and the content of a compatibilizer for kneading the resin and the continuous fiber in the shaping material was 6%. The temperature of the shaping material supplied to the pressure roller of the shaping apparatus was 250° C., and the shaping material was delivered onto the stage.

Comparative Example

In Comparative Example, the continuous fiber of the shaping material was Torayca T300 manufactured by Toray Industries, Inc., and the elongation rate was 1.5%. The continuous fiber was used without being cut and was not twisted. The Vf of the shaping material was 50% and the content of the compatibilizer was 6%. The temperature of the shaping material supplied to the pressure roller of the shaping apparatus was 250° C., and the shaping material was delivered onto the stage.

Difference Between Examples and Comparative Example

In Examples, the delivery amount of the continuous fiber of the shaping material was changed according to the difference in the path lengths generated between the inner side and the outer side when changing the applying direction.

On the other hand, in Comparative Example, the delivery amount of the continuous fiber of the shaping material was not changed according to the difference in the path lengths generated between the inner side and the outer side when changing the applying direction.

In Examples, shaping was performed by disposing four pieces of shaping material each having a width dimension of 1 mm and a thickness dimension of 0.5 mm in parallel. As the method, for example, four ejection ports were provided in the delivery unit 40 of the second exemplary embodiment to form four pieces of shaping material.

On the other hand, in Comparative Example, shaping was performed using one shaping material having a width dimension of 4 mm and a thickness dimension of 0.5 mm.

Example 6, Example 12, and Example 18

Example 6, Example 12, and Example 18 were different from other Examples and Comparative Example in the elongation rate of the continuous fiber used.

In Example 6, the continuous fibers in all pieces of shaping material were Torayca T1000GB manufactured by Toray Industries, Inc., and the elongation rate of the continuous fibers was 2.2%.

In Example 12, only the continuous fiber of the shaping material disposed at the inner side of the curved portion was Torayca T1000GB manufactured by Toray Industries, Inc., and the elongation rate was 2.2%. The continuous fiber of other pieces of shaping material were Torayca T300 manufactured by Toray Industries, Inc., and the elongation rate was 1.5%.

That is, the elongation rate of the continuous fiber of the shaping material ejected from respective ejection ports of the delivery unit was changed at the respective ejection ports disposed in the intersection direction. Accordingly, a shaping material having the elongation rate of continuous fiber different in the intersection direction was formed.

In Example 18, the continuous fiber of the shaping material disposed at the outer side among four pieces of shaping material disposed in parallel was Torayca T1000GB manufactured by Toray Industries, Inc., and the elongation rate of the continuous fiber was 2.2%. Accordingly, the elongation rate of the continuous fiber of the shaping material disposed at the inner side of the curved portion was 2.2%.

That is, the elongation rate of the continuous fiber of the shaping material ejected from respective ejection ports of the delivery unit was changed at the respective ejection ports disposed in the intersection direction. Accordingly, a shaping material having the elongation rate of continuous fiber different in the intersection direction was formed.

Other conditions were the same as in Example 5.

Example 7, Example 13, and Example 19

Example 7, Example 13, and Example 19 were different from other Examples and Comparative Example in the Vf of the continuous fiber used. The Vf was changed by increasing the amount of the resin in the shaping material.

In Example 7, the Vf of all pieces of the shaping material was smaller than others, and the Vf was 20%.

In Example 13, only the Vf of the shaping material disposed at the inner side of the curved portion was 20%, and the Vf of other pieces of shaping material was 50%.

In Example 19, the Vf of the pieces of shaping material disposed at the outer sides among the four pieces of shaping material disposed in parallel was 20%, and the Vf of other pieces of shaping material was 50%. Accordingly, when shaping the curved portion, the Vf of the shaping material disposed at the inner side of the curved portion was 20%.

Other conditions were the same as in Example 5.

Example 8, Example 14, and Example 20

In Example 8, Example 14, and Example 20, the shaping material included cut fibers obtained by cutting the continuous fibers compared to other Examples and Comparative Example. The cut fiber was obtained by cutting the continuous fiber described above, and the length dimension of the cut fiber was 0.1 mm or more and 3 mm or less. The shaping material using the cut fibers had a Vf of 30%.

In Example 8, the cut fibers obtained by cutting the continuous fibers were used in all pieces of shaping material compared to others.

In Example 14, the cut fibers were used only for the shaping material disposed at the inner side of the curved portion, and continuous fibers not cut were used for other pieces of shaping material.

That is, a shaping material was formed by ejecting the shaping material including continuous fibers, and the shaping material including cut fibers from different ejection ports disposed in the intersection direction. Accordingly, a region including continuous fibers, and a region including cut fibers were disposed side by side in the intersection direction of the shaping material.

In Example 20, the cut fibers were used for the shaping material disposed at the outer side among the four pieces of shaping material disposed in parallel, and continuous fibers not cut were used for other pieces of shaping material. Accordingly, when shaping the curved portion, a shaping material using cut fibers was disposed at the inner side of the curved portion.

In addition, a shaping material was formed by ejecting the shaping material including continuous fibers, and the shaping material including cut fibers from different ejection ports disposed in the intersection direction. Accordingly, a region including continuous fibers, and a region including cut fibers were disposed side by side in the intersection direction of the shaping material.

Other conditions were the same as in Example 5.

Example 9, Example 15, and Example 21

In Example 9, Example 15, and Example 21, the content of the compatibilizer contained in the resin of the shaping material was smaller than those in other Examples and Comparative Example. The content of the compatibilizer may be 0. Accordingly, adhesiveness between the continuous fibers and the resin decreased. In other words, a resin having low adhesiveness to the continuous fibers was used for the shaping material.

In Example 9, in all pieces of shaping material compared to others, the content of the compatibilizer contained in the resin of the shaping material was 2%, and the content of the compatibilizer contained in the resin of other pieces of shaping material was 6%.

In Example 15, only the content of the compatibilizer contained in the resin of the shaping material disposed at the inner side of the curved portion was 2%, and the content of the compatibilizer contained in the resin of other pieces of shaping material was 6%.

In Example 21, the content of the compatibilizer contained in the resin of the shaping material disposed at the outer side among the four pieces of shaping material disposed in parallel was 2%. Accordingly, when shaping the curved portion, a shaping material having a content of the compatibilizer contained in the resin of 2% was disposed at the inner side of the curved portion.

Other conditions were the same as in Example 5.

Example 10, Example 16, and Example 22

In Example 10, Example 16, and Example 22, the shaping material included twisted continuous fibers compared to other Examples and Comparative Example.

In Example 10, the twisted continuous fibers were used in all pieces of shaping material compared to other Examples. This continuous fiber had a twist rate of 45 degrees, for example, and was twisted such that each continuous fiber was inclined 45 degrees with respect to the length direction of the continuous fibers.

In Example 16, the twisted continuous fibers were used only for the pieces of shaping material disposed at the inner side of the curved portion, and continuous fibers in other pieces of shaping material were not twisted.

Accordingly, in the intersection direction, the shaping material had different twist rates of the continuous fibers disposed in the intersection direction, and a shaping material was formed by setting the twist rates of the continuous fibers in the pieces of shaping material ejected from respective ejection ports of the delivery unit to be different at respective ejection ports disposed in the intersection direction.

In Example 22, the twisted continuous fibers were used for the shaping material disposed at the outer side among the four pieces of shaping material disposed in parallel, and continuous fibers in other pieces of shaping material were not twisted. Accordingly, when shaping the curved portion, a shaping material having twisted continuous fibers was disposed at the inner side of the curved portion.

Other conditions were the same as in Example 5.

Example 11, Example 17, and Example 23

Example 11, Example 17, and Example 23 were different from other Examples and Comparative Example in the temperature of the shaping material to be delivered onto the stage.

In Example 11, the temperature of all pieces of shaping material to be delivered onto the stage was 280° C. compared to others.

In Example 17, the temperature was 280° C. only for the shaping material disposed at the inner side of the curved portion, and the temperature of other pieces of shaping material was 250° C.

Accordingly, the temperature of the shaping material to be delivered onto the stage was different for the pieces of shaping material disposed in the intersection direction. For example, the pieces of shaping material to be ejected from respective ejection ports were set to different temperatures by setting the temperature of the pieces of shaping material to be delivered to respective ejection ports of the delivery unit to different temperatures.

Examples of the method include a configuration including heating means for heating the pieces of shaping material to be delivered to respective ejection ports of the delivery unit to different temperatures.

In Example 23, the temperature of the shaping material disposed at the outer side among the four pieces of shaping material disposed in parallel was 280° C., and the temperature of other pieces of shaping material was 250° C. Accordingly, when shaping the curved portion, a shaping material heated to 280° C. was disposed at the inner side of the curved portion.

Other conditions were the same as in Example 5.

For all these Examples, 1 or less is obtained in the evaluation of the electrical resistance value, and 20 Pa or more is obtained in the evaluation of the flexural modulus. The determination results obtained from the evaluation of the electrical resistance value and the evaluation of the flexural modulus are all good.

In addition, in Example 6, Example 12, and Example 18 in which the elongation rate of the continuous fiber used in the shaping material is changed, the elongation rate at the inner side of the curved portion may be increased compared to a case where the elongation rate of the continuous fiber is constant in the intersection direction. Accordingly, it is possible to easily bend the inner side where the curvature is high.

Further, in Example 10, Example 16, and Example 22 using the continuous fibers in the shaping material are twisted, the twist rate at the inner side of the curved portion may be increased compared to a case where the twist rate of the continuous fiber is constant in the intersection direction. Accordingly, it is possible to easily bend the inner side where the curvature is high.

Further, in Example 8, Example 14, and Example 20 using the cut fibers in the shaping material, the cut fibers may be disposed at the inner side of the curved portion compared to a case where the continuous fibers are used throughout the intersection direction. Accordingly, it is possible to easily bend the inner side where the curvature is high.

Further, in Example 11, Example 17, and Example 23 in which the temperature of the shaping material to be delivered onto the stage is different in the intersection direction, the temperature at the inner side of the curved portion may be increased compared to a case where the temperature is constant throughout the intersection direction. Accordingly, it is possible to easily bend the inner side where the curvature is high.

In the shaping material of respective Examples, continuous fibers having different elongation rates are used, twisted continuous fibers are used, cut fibers that are cut off are used, or the temperature is changed. However, the present invention is not limited to this. If the delivery amount of the continuous fiber at the inner side and the outer side is changed according to the difference in the path lengths generated between the inner side and the outer side when changing the applying direction of the shaping material, the effect of the present application may be obtained.

In respective Examples, the case where four pieces of shaping material are disposed in parallel and shaped is described as an example, but the present invention is not limited to this.

For example, as shown in FIG. 3 or FIG. 10, in the shaping apparatus configured to form one shaping material using the delivery unit 40 provided with a single ejection port 58, a shaping material having different elongation rates of the continuous fibers in the intersection direction may be used, or a shaping material having different twist rates of the continuous fibers in the intersection direction may be used. In addition, in the shaping apparatus configured to form one shaping material, a shaping material in which a region including continuous fibers and a region including cut fibers are disposed side by side in the intersection direction may be used, or a shaping material having different temperature in the intersection direction may be used.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A shaping apparatus comprising:
   a stage;
   a nozzle;
   a plurality of rollers configured to supply a plurality of shaping materials to the nozzle; and
   a controller implemented with hardware, the nozzle being configured to:
deliver and apply the plurality of shaping materials in each of which a plurality of continuous fibers are impregnated with a resin onto the stage; and,
the controller being configured to control the plurality of rollers and the nozzle to:
change delivery amounts between an inner side and an outer side of a path of the plurality of shaping materials according to a difference in path lengths between the inner side and the outer side, the difference being generated when an applying direction of the plurality of shaping materials is changed,
wherein the nozzle includes an ejection port that ejects the plurality of shaping materials, and a width of the ejection port in an intersection direction intersecting to the applying direction is larger than a length of the ejection port in the applying direction.

2. The shaping apparatus according to claim 1,
wherein the controller is configured to control the plurality of rollers and the nozzle to decrease a number of continuous fibers delivered from a portion of the ejection port located at the inner side of the path compared to the number of continuous fibers delivered from a portion of the ejection port located at the outer side of the path when the applying direction is changed.

3. The shaping apparatus according to claim 1,
wherein each elongation rate of the plurality of the continuous fibers disposed in the intersection direction in the plurality of shaping materials differs from each other depending on positions in the intersection direction.

4. The shaping apparatus according to claim 1,
wherein the continuous fibers include twisted continuous fibers, and twist rates of the continuous fibers disposed in the intersection direction are different depending on positions in the intersection direction.

5. The shaping apparatus according to claim 1,
wherein the plurality of shaping materials further includes cut fibers that are cut off, and each of the plurality of shaping materials has a region including the continuous fibers and a region including the cut fibers, the regions being disposed in the intersection direction.

6. The shaping apparatus according to claim 1,
wherein a temperature of the plurality of shaping materials to be delivered onto the stage differs depending on a position in the intersection direction.

7. The shaping apparatus according to claim 1,
wherein the nozzle includes a plurality of ejection ports for ejecting the plurality of shaping materials, the ejection ports being aligned in an intersection direction intersecting the applying direction.

8. The shaping apparatus according to claim 7,
wherein the nozzle includes a separate line ejection port configured to eject a portion of the plurality of shaping materials from a position shifted to the intersection direction from the ejection ports aligned in the intersection direction, and the separate line ejection port is disposed in a region between adjacent ejection ports in the intersection direction, the region extending in the applying direction.

9. The shaping apparatus according to claim 7,
wherein when changing the applying direction, the nozzle is configured to make a width of a portion of the plurality of shaping materials ejected from the ejection port located at an inner side of the path thinner than a width of a portion of the plurality of shaping materials ejected from the ejection port located at an outer side of the path.

10. The shaping apparatus according to claim 7,
wherein when changing the applying direction, the controller is configured to control the plurality of rollers and the nozzle to decrease a percentage of the continuous fibers included in a portion of the plurality of shaping materials ejected from the ejection port located at the inner side of the path compared to a percentage of the continuous fibers included in a portion of the plurality of shaping materials ejected from the ejection port located at the outer side.

11. The shaping apparatus according to claim 10,
wherein when changing the applying direction, the controller is configured to control the plurality of rollers and the nozzle to increase a content of the resin in a portion of the plurality of shaping materials ejected from the ejection port located at the inner side of the path compared to a content of the resin in a portion of the plurality of shaping materials ejected from the plurality of shaping materials located at the outer side of the path.

12. The shaping apparatus according to claim 7,
wherein elongation rates of the continuous fibers in the plurality of shaping materials respectively ejected from the ejection ports aligned in the intersection direction are different from each other.

13. The shaping apparatus according to claim 7,
wherein the continuous fibers comprise twisted continuous fibers, and twist rates of the continuous fibers in the plurality of shaping materials respectively ejected from the ejection ports aligned in the intersection direction are different from each other.

14. The shaping apparatus according to claim 7,
wherein the plurality of shaping materials further include a set of cut fibers that are cut off, and the plurality of shaping materials including the continuous fibers and the plurality of shaping materials including the cut fibers are ejected from different ejection ports aligned in the intersection direction.

15. The shaping apparatus according to claim 7,
wherein temperatures of the plurality of shaping materials respectively ejected from the ejection ports aligned in the intersection direction differ from each other.

16. The shaping apparatus according to claim 8,
wherein elongation rates of the continuous fibers in the plurality of shaping materials respectively ejected from the ejection ports aligned in the intersection direction are different from each other.

17. The shaping apparatus according to claim 8,
wherein the continuous fibers comprise twisted continuous fibers, and twist rates of the continuous fibers in the plurality of shaping materials respectively ejected from the ejection ports aligned in the intersection direction are different from each other.

18. The shaping apparatus according to claim 8,
wherein the plurality of shaping materials further include a set of cut fibers that are cut off, and the plurality of shaping materials including the continuous fibers and the plurality of shaping materials including the cut fibers are ejected from different ejection ports aligned in the intersection direction.

19. The shaping apparatus according to claim 8,
wherein temperatures of the plurality of shaping materials respectively ejected from the ejection ports aligned in the intersection direction differ from each other.

20. A shaping apparatus comprising:
a stage;
a nozzle;
a plurality of rollers configured to supply a plurality of shaping materials to the nozzle; and
a controller implemented with hardware,
the nozzle being configured to:
   deliver and apply a plurality of shaping materials in which a plurality of continuous fibers is impregnated with a resin onto the stage, and
the controller being configured to control the plurality of rollers and the nozzle to:
   change delivery amounts between an inner side and an outer side of a path of the plurality of shaping materials according to a difference in path lengths between the inner side and the outer side, the difference being generated when an applying direction of the plurality of shaping materials is changed,
wherein the nozzle includes a plurality of ejection ports for ejecting the plurality of shaping materials, the ejection ports being aligned in a staggered pattern in an intersection direction intersecting the applying direction.

\* \* \* \* \*